US012731283B2

(12) United States Patent
Ruppel et al.

(10) Patent No.: US 12,731,283 B2
(45) Date of Patent: Sep. 8, 2026

(54) METHOD FOR IDENTIFYING UNCERTAINTIES DURING THE DETECTION OF MULTIPLE OBJECTS

(71) Applicant: Robert Bosch GmbH, Stuttgart (DE)

(72) Inventors: Felicia Ruppel, Renningen (DE); Florian Faion, Staufen (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 18/490,369

(22) Filed: Oct. 19, 2023

(65) Prior Publication Data

US 2024/0135577 A1 Apr. 25, 2024
US 2024/0233170 A9 Jul. 11, 2024

(30) Foreign Application Priority Data

Oct. 25, 2022 (DE) ..................... 10 2022 211 285.7

(51) Int. Cl.
*G06T 7/73* (2017.01)
*G06T 7/246* (2017.01)

(52) U.S. Cl.
CPC ................ *G06T 7/73* (2017.01); *G06T 7/246* (2017.01); *G06T 2207/10028* (2013.01); *G06T 2207/20084* (2013.01)

(58) Field of Classification Search
CPC .... G06T 7/73; G06T 7/70; G06T 7/00; G06T 7/246; G06T 7/20; G06T 2207/10028; G06T 2207/10; G06T 2207/00; G06T 2207/20084; G06T 2207/20; G06N 3/0455; G06N 3/045; G06N 3/04; G06N 3/02; G06N 3/00; G06N 3/048; G06N 3/0499; G06N 3/088; G06N 3/08; G06N 3/09;

(Continued)

(56) References Cited

U.S. PATENT DOCUMENTS

2022/0301216 A1* 9/2022 Yang ........................ G06N 3/08
2023/0196787 A1* 6/2023 Agrawal .............. G06V 10/761 382/103
2024/0062520 A1* 2/2024 Park ....................... G06V 20/56

OTHER PUBLICATIONS

Vaswani et al., "Attention is All You Need," 31st Conference on Neural Information Processing Systems (NIPS 2017), 2017, pp. 1-11.<https://proceedings.neurips.cc/paper_files/paper/2017/file/3f5ee243547dee91fbd053c1c4a845aa-Paper.pdf> Downloaded Oct. 19, 2023.

* cited by examiner

*Primary Examiner* — Mohamed Charioui
(74) *Attorney, Agent, or Firm* — Norton Rose Fulbright US LLP

(57) ABSTRACT

A method for identifying uncertainties during the detection and/or tracking of multiple objects from point cloud data using a transformer with an attention model. The state of the tracked objects is stored in the feature space. The method includes: calculating feature vectors from the point cloud data by means of a backbone, wherein the feature vectors serve as key vectors for the transformer; calculating anchor positions from the point cloud data by means of a sampling method; ascertaining feature vectors from the anchor positions using an encoding, wherein the feature vectors serve as object queries for the transformer; calculating attention weights for cross-attention from the object queries and a spatial structure used by the backbone; determining the greatest attention weights of the transformer for each object query; calculating a covariance matrix for the greatest attention weights; calculating the determinant of the covariance matrix to obtain an attention spread.

8 Claims, 3 Drawing Sheets

(58) Field of Classification Search
CPC ........ G06V 10/62; G06V 10/40; G06V 10/00; G06V 10/82; G06V 10/70; G06V 20/653; G06V 20/64; G06V 20/60; G06V 20/20; G06F 18/213; G06F 18/21; G06F 18/20; G06F 18/00
See application file for complete search history.

backbone
position encoding
Fourier encoding
feed-forward network
intrinsic speed compensation
AS
t
t+1

METHOD FOR IDENTIFYING UNCERTAINTIES DURING THE DETECTION OF MULTIPLE OBJECTS

CROSS REFERENCE

The present application claims the benefit under 35 U.S.C. § 119 of German Patent Application No. DE 10 2022 211 285.7 filed on Oct. 25, 2022, which is expressly incorporated herein by reference in its entirety.

FIELD

The present invention relates to a method for identifying uncertainties during the detection and/or tracking of multiple objects from point cloud data by means of a transformer with an attention model.

BACKGROUND INFORMATION

In imaging sensors, object detection is carried out nowadays. Multiple objects are typically located in the captured environment, and therefore a detection of multiple objects is carried out. For example, object detection is used in sensors for vehicles in order to identify other vehicles, other road users, and the infrastructure. These data can be used for (partially) automated or autonomous driving.

Recently, the use of transformers for object detection has been pursued. Transformers are described in the paper by Ashish Vaswani et al., "Attention is all you need", arXiv preprint arXiv:1706.03762, 2017, initially in the context of language processing. In object detection, bounding boxes and their box parameters describing the object, i.e., for example, its position, dimensions, orientation, speed, and/or class identifier, are ascertained from a measurement for each object. The transformers can also be used for downstream applications, such as object tracking, prediction, or (path) planning. When transformers are used for object detection, the suppression of overlapping detections conventionally applied in the post-processing can be neglected.

Uncertainties are divided into two classes: epistemic uncertainties originate from uncertainties in the model, for example if an observation was made that is not present in the training data. In addition, an unstructured and dynamic environment can lead to such uncertainties, since this variety can hardly be covered by a training data set. Contrasting with these are aleatory uncertainties, which originate from sensor noise and/or arise due to poor visibility of the sensor and/or a large distance from the sensor.

SUMMARY

According to the present invention, a method is provided for identifying uncertainties during the detection and/or tracking of multiple objects from point cloud data by means of a transformer with an attention model. The point cloud data are collected by a sensor, for example by a LiDAR. However, this method is not limited to LiDAR, but other types of sensors can also be used. The sensor or the sensor system is preferably arranged on a vehicle, so that the point cloud data are collected from the vehicle.

According to an example embodiment of the present invention, the method comprises the following steps: At the beginning, feature vectors are calculated from the point cloud data. This is not performed by the encoder of the transformer, but by a backbone.

A backbone is a neural network that is used to extract features from measured data or to bring the input into a certain feature representation, which can then be further processed. The encoder of the transformer can thus be dispensed with. The backbone transfers the typically three-dimensional point cloud data into a spatial structure. Preferably, the output of the backbone is reformatted in order to obtain a sequence of feature vectors with a specifiable length. By using the backbone for calculating the feature vectors, the length of the input sequence is less limited than with an encoder of the transformer and instead, in the case of a grid-based backbone, such as PointPillars, a sufficiently small cell size can be selected. The feature vectors thus calculated are then supplied to the transformer and serve as key vectors and value vectors for ascertaining the cross-attention. The output feature vectors that are used as key vectors and as value vectors can thus each be assigned to a location in space.

Generally, according to an example embodiment of the present invention, the attention weights can be assigned to any point in space. Preferably, the spatial structure is a grid. The backbone transfers the three-dimensional point cloud data into the grid structure. It encodes the content of each grid cell into a feature vector. Different types of grids can be used, both two-dimensional grids and three-dimensional grids. A grid from the bird's eye view has emerged as particularly suitable for representing the scenery.

In addition, according to an example embodiment of the present invention, first anchor positions for a first layer of the transformer are calculated from the point cloud data by a sampling method such as farthest point sampling (FPS). Feature vectors are ascertained from the first anchor positions by means of encodings, for example Fourier encoding. The encoding can in particular be completed by a feed-forward network. The feature vectors thus calculated serve as object queries for the first layer of a decoder of the transformer. The object queries of the anchor positions serve as starting points for the search for objects. However, the search is not limited to these anchor positions, but objects are also detected at a distance from these anchor positions. Anchor positions do not correspond to anchor boxes as used in other detection approaches. The object queries for the transformer are thus dependent on data and are not learned as usual. This offers advantages especially in the case of sparse point clouds, since otherwise many computing resources are wasted on finding positions that actually have data. Such sparse point clouds arise in particular in measurements with LiDAR. The object queries ascertained from the anchor positions serve as slots for possible objects.

According to an example embodiment of the present invention, for detection of the objects, a decoder of the transformer ascertains result feature vectors, which are also referred to as decoder output vectors, by means of cross-attention from the object queries, i.e., the above-described feature vectors, and the key vectors and value vectors, i.e., the feature vectors described at the outset. From the result feature vectors, box parameters are calculated for bounding boxes describing an object, i.e., for example, its position or position differences relative to the anchor positions, dimensions, orientation, speed, and/or class identifier, by means of a feed-forward network. For this purpose, a different feed-forward network from the above-mentioned feed-forward network, which differs by the weighting, is preferably used for ascertaining the object queries.

Cross-attention between the object queries and the key vectors calculated from the output of the backbone takes place in the decoder of the transformer. The value vectors are not required to calculate the attention weights. For this purpose, an attention weight is calculated in pairs for each combination of object query and key vector. The attention weights ascertained anyway during detection are preferably used for identifying uncertainties during the detection.

According to an example embodiment of the present invention, the attention weights relating to each key vector can be interpreted in the spatial structure used by the backbone. If the spatial structure is a grid, the attention weights relating to each key vector can be interpreted in the grid cells, since each key vector is assigned to a grid cell.

The attention weights are preferably ascertained for each layer of the decoder. After calculation, the attention weights are preferably present in attention weight matrices. Optionally, the two-dimensional attention weight matrices can be converted into three-dimensional matrices according to the feature vectors, in particular the key vectors, of the backbone. Thus, for each object detected in the manner described above, attention weight matrices are obtained for each layer of the decoder. These indicate which input data the relevant query has accessed in order to recognize this object.

According to an example embodiment of the present invention, for each object query, a specifiable number k of greatest attention weights is determined from the calculated attention weights, described by the set $S^k$. The specifiable number depends on the desired accuracy and the computational effort to be applied. It is thus not necessary to calculate all the attention weights, but rather a small selection of the greatest attention weights is sufficient. Generally, the greatest attention weights can be calculated from all layers of the decoder in order to obtain an early and/or accurate result. Preferably, the greatest attention weights are calculated only from the last layer of the decoder in order to minimize the computational effort. An attention covariance is then calculated from the greatest attention weights by means of a covariance matrix $C_K$:

$$C_k = \frac{1}{W}\sum_{i \in S^k} w_i \left[\begin{pmatrix} x_i \\ y_i \end{pmatrix} - \mu_k\right]\left[\begin{pmatrix} x_i \\ y_i \end{pmatrix} - \mu_k\right]^T$$

where $W=\Sigma_{i \in S^k} w_i$, and $\mu_K$ is the empirical expected value for the greatest attention weights for each layer and is defined as follows:

$$\mu_k = \frac{1}{W}\sum_{i \in S^k} w_i \begin{pmatrix} x_i \\ y_i \end{pmatrix}$$

The space is assumed here to be a two-dimensional area in the x and y directions, as is represented, for example, in the bird's eye view. Optionally, the third dimension ($z_i$) can be added in the calculation.

A robust estimator such as the Huber loss function $L_\delta$ can also be used for the calculation:

$$C_k = \frac{1}{W}\sum_{i \in S^k} w_i \begin{cases} \left[\begin{pmatrix} x_i \\ y_i \end{pmatrix} - \mu_k\right]\left[\begin{pmatrix} x_i \\ y_i \end{pmatrix} - \mu_k\right]^T, \text{ for } \left|\begin{pmatrix} x_i \\ y_i \end{pmatrix} - \mu_k\right| \le \delta \\ \delta\left(2\left|\begin{pmatrix} x_i \\ y_i \end{pmatrix} - \mu_k\right| - \delta\right), \text{ otherwise} \end{cases}$$

$\delta$ represents a threshold value. In the top case, for small deviations from the expected value $\mu_k$, the above-described covariance matrix is calculated. Large outliers from the expected value $\mu_k$ exceeding the threshold value are calculated in the bottom case and contribute only linearly and not quadratically to the covariance matrix.

By calculating the determinants of the covariance matrix $C_k$, an attention spread AS is ultimately obtained, which as a value represents a measure of the uncertainty.

$$AS = \det C_k$$

In the following, the relationship between the attention spread and the IoU (intersection-overunion) between the ascertained bounding boxes and the bounding boxes of closest object according to the ground truth is described. IoU is the quotient of the intersection of the ascertained bounding box $B_e$ with the bounding box $B_{gt}$ according to the ground truth and the union of same:

$$IoU = \frac{B_e \cap B_{gt}}{B_e \cup B_{gt}}$$

A greater IoU value corresponds to a more precise detection of the object. The IoU measure correlates with the epistemic uncertainty. IoU values of zero, in which therefore no overlap is present, were removed for the comparison. From the comparison, it can be seen that the attention spread falls with increasing IoU. Thus, a low attention spread shows a high IoU and thus a low epistemic uncertainty, and vice versa. The attention spread is thus an indicator of the epistemic uncertainty.

Furthermore, the behavior of the attention spread was investigated for different distances of the bounding boxes from the sensor sensing the point cloud. The attention spread increases with increasing distance. Thus, the attention spread behaves in accordance with the aleatory uncertainty and is thus an indicator of same.

According to an example embodiment of the present invention, a computer program is configured to carry out each step of the method according to the present invention, in particular when it is executed on a computing device or control unit. It allows the method to be implemented in a conventional electronic control unit without having to make structural changes thereto. For implementation, the computer program is stored on the machine-readable storage medium.

By installing the computer program on a conventional electronic control unit, the electronic control unit is obtained which is configured to identify uncertainties for a detection and/or tracking of multiple objects from point cloud data.

BRIEF DESCRIPTION OF THE DRAWINGS

Exemplary embodiments of the present invention are illustrated in the figures and explained in more detail in the following description.

DETAILED DESCRIPTION OF EXAMPLE EMBODIMENTS

Figure 1:
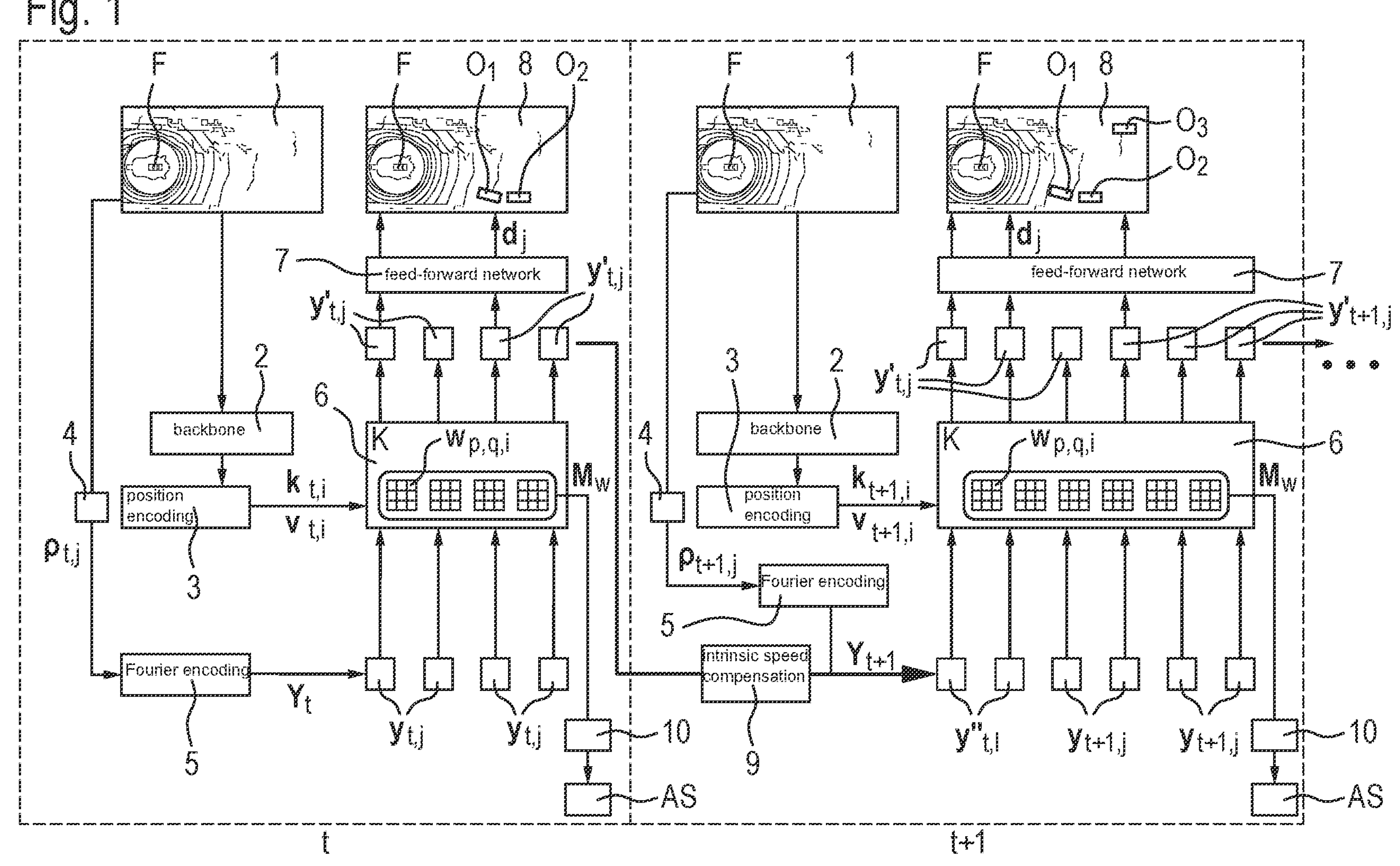
FIG. 1 shows a flowchart of an example embodiment of the method according to the present invention.

FIG. 1 shows a flowchart of the method according to an example embodiment of the present invention at two successive time points t and t+1. The same steps are denoted by the same reference signs and described in detail only once. In the following, i and k denote control variables as indices. p and q are indices assigned to a bird's eye view grid. Each index q is associated with a horizontal position in the x direction, and each index p is associated with a vertical position in the y direction of the bird's eye view grid.

The left side relates to the first time point t. At the beginning, a LiDAR sensor of a vehicle F senses the surroundings. A visual representation of these collected point cloud data is denoted by 1. A backbone 2 calculates feature vectors from the point cloud data. The backbone 2 transfers the three-dimensional point cloud data into a grid structure. As an example, the backbone 2 uses a grid from the bird's eye view with 128×128 grid cells. The backbone 2 encodes the content of each grid cell in each case into a feature vector, for example with a dimension of 64, so that the result has the size 128×128×64. This result is converted into a sequence of feature vectors with the size (128×128)×64. From this sequence of feature vectors, key vectors $k_{t,i}$ and value vectors $v_{t,i}$ are then calculated by position encoding 3. In the present example, 128×128 key vectors $k_{t,i}$ and just as many value vectors $v_{t,i}$ are thus obtained. The number 128×128 is defined below as N, so that the grid has a size of $\sqrt{N}\times\sqrt{N}$. The key vectors $k_{t,i}$ and value vectors $v_{t,i}$ are then supplied to a decoder 6 of the transformer.

At the same time, anchor positions $\rho_{t,j}$ at the first time point t are ascertained from the point cloud data by a sampling method 4, for example farthest point sampling, and then undergo Fourier encoding 5:

$$y_j = FFN[\sin(B\rho_j), \cos(B\rho_j)]$$

B is a matrix which has entries of the normal distribution, FFN represents a feed-forward network, which consists here of two layers with a ReLU activation (Rectified Linear Unit). $y_j$ are the calculated feature vectors, which are supplied as object queries to the decoder 6 of the transformer. The number of anchor positions is 100, for example, and is referred to below as M (the control variable j runs from 1 to M).

The set of feature vectors output for the first time point t is denoted with $Y_t$ and consist of the object queries $y_{t,j}$. Each object query $y_{t,j}$ is used as a slot (shown in FIG. 1 by individual boxes) for a possible object. The decoder 6 of the transformer consists of six layers K with eight attention heads in each case. The decoder 6 ascertains result feature vectors $$y'_{t,j}$$

at the first time point t from the object queries $y_{t,j}$ and the key vectors $k_{t,i}$ and the value vectors $v_{t,i}$. For the detection, the decoder 6 calculates attention weights $w_{p,q,i,}$ for each object query $y_{t,j}$. The attention weights $w_{p,q,i,}$ are stored in an attention weight matrix $M_w$. Since these attention weights $w_{p,q,i,}$ have been ascertained in this example on the basis of the bird's eye view grid, the index q can be associated with a position $x_q$ in the x direction of the bird's eye view grid, and the index p can be associated with a position $y_p$ in the y direction of the bird's eye view grid. In the decoder 6, attention weight matrices $M_w$ are ascertained in each layer K. The attention weights $w_{p,q,i,}$ or the attention weight matrices $M_w$ are used for ascertainment 10 of an attention spread AS, as described below in connection with FIG. 2.

Two objects $O_1$ and $O_2$ are detected at the first time point t. From the result feature vectors $$y'_{t,j},$$

a feed-forward network 7 calculates box parameters $d_j$ for the objects $O_1$, $O_2$. The objects $O_1$, $O_2$ have been detected and are shown here in the visual representation denoted by 8.

Object tracking for an object $O_1$, $O_2$ is only continued if the confidence is above a threshold value in the corresponding time step. Otherwise, the object tracking of this object is paused or terminated.

On the right-hand side in FIG. 1, the evaluation is shown for a second time point t+1, which follows the first time point t after a time step defined by the repetition rate of the recording of the LiDAR sensor. In this time step, the vehicle F continues at its intrinsic speed. This affects the evaluation of the measured data and the relative position and speed of the objects $O_1$, $O_2$. An intrinsic speed compensation 9 is carried out. From the result feature vectors $$y'_{t,j}$$

for the first time point t, the anchor positions $\rho_{t,j}$, and a change in pose p, transformed result feature vectors $$y''_{t,l}$$

are obtained:

$$y''_{t,l} = EMC(y'_{t,j}, \rho_j, p)$$

In this case too, analogously to the first time point t, at the beginning the LiDAR sensor senses the surroundings, and the backbone 2 calculates, from the point cloud data, feature vectors that are augmented by the position encoder 3 by means of sine and cosine and finally are supplied as key vectors $k_{t+1,i}$ and value vectors $v_{t+1,i}$ to the decoder 6 of the transformer for the second time point t+1. For this purpose, the backbone uses the same grid as described above. At the same time, anchor positions $\rho_{t+1,j}$ at the second time point t+1 are ascertained from the point cloud data by means of the sampling method 4 and then undergo Fourier encoding 5 according to formula 1. Object queries $y_{t+1,j}$ are obtained for the second time point t+1.

The set of feature vectors output for the second time point t+1 is denoted with $Y_{t+1}$ and consist of the object queries $y_{t+1,j}$ for the second time point t+1 and the transformed result feature vectors $$y''_{t,l}$$

calculated for the first time point t, and can be represented as a union.

$$Y_{t+1} = \{y''_{t,l}\}_{l=1}^{L} \cup \{y_{t+1,j}\}_{j=1}^{M}$$

Each object query $y_{t+1,j}$ and each transformed result feature vector $$y''_{t,l}$$

are used as slots (shown in FIG. 1 by individual boxes) for a possible object.

The decoder 6 ascertains result feature vectors $$y'_{t+1,j}$$

at the second time point t+1 from the object queries $y_{t,j}$, the transformed result feature vectors $$y''_{t,l}$$

and the key vectors $k_{t+1,i}$ and the value vectors $v_{t+1,i}$. Here, too, the decoder 6 calculates attention weights $w_{p,q,i}$ for each object query $y_{t,j}$ and each transformed result feature vector $$y''_{t,l}$$

in each layer K of the decoder 6. Attention weights $w_{p,q,i}$ are likewise stored in attention weight matrices $M_w$. The attention weights $w_{p,q,i}$ or the attention weight matrices $M_w$ are again used for the ascertainment 10 of the attention spread AS, as described below in connection with FIG. 2.

A new object $O_3$ is only tracked in the result feature vectors $$y'_{t+1,j}$$

if the confidence is above a threshold value. In addition to the two objects $O_1$ and $O_2$, a third object $O_3$ is detected, the path of which is further tracked. From the result feature vectors $$y'_{t,j},$$

the feed-forward network 7 calculates box parameters $d_j$ for the objects $O_1$, $O_2$, $O_3$. Here too, the objects $O_1$, $O_2$, $O_3$ are shown in the visual representation denoted by 8. As a result, the multiple objects $O_1$, $O_2$, $O_3$ are detected at a further time step t+1.

Figure 2:
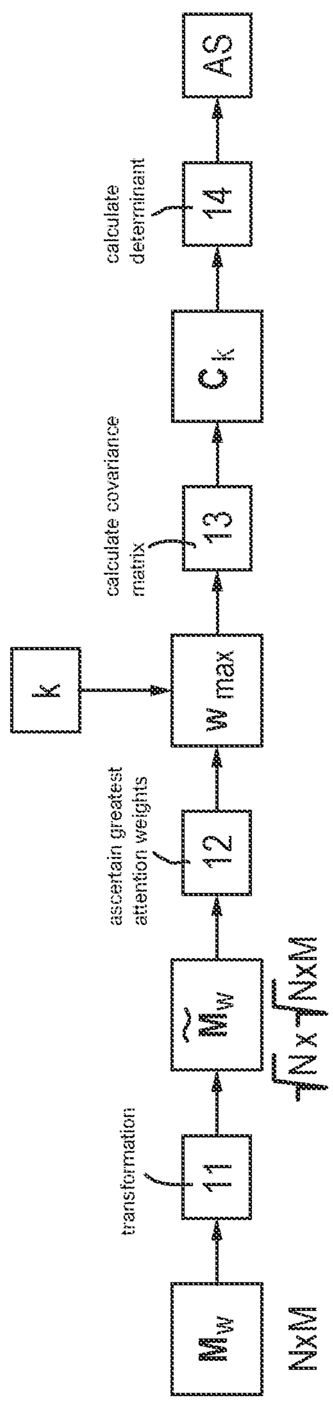
FIG. 2 shows a flowchart for calculating the attention spread according to an example embodiment of the present invention.

FIG. 2 shows the ascertainment of the attention spread AS. The attention weights $w_{p,q,i}$ calculated in the decoder 6 for the detection of the objects $O_1$, $O_2$, $O_3$ are stored in attention weight matrices $M_w$ of size N×M, i.e., the number of input object queries M and the length of the vectors of the input object queries N. In the present example for 100 object queries $y_j$ (and additionally the transformed result feature vectors $$y''_{t,l},$$

which are not mentioned every time here for reasons of clarity), an attention weight matrix of size (128*128)×100 is thus obtained. By means of a transformation 11, the attention weight matrix $M_w$ is converted into a transformed attention weight matrix $\tilde{M}_w$ of size $\sqrt{N}\times\sqrt{N}\times M$, i.e., the size of the grid $\sqrt{N}\times\sqrt{N}$, which results from the associated positions to key vectors $k_i$ and value vectors $v_i$ and the length M of the vectors of the input object queries. In this example, the size is 128×128×100. This can also be interpreted as a 1 grid of size 128×128 per object query $y_j$. Thus, a relationship is produced between the transformed attention weight matrix $\tilde{M}_w$, the object queries $y_j$ (and the transformed result feature vectors $$y''_{t,l})$$

and the grid. For each object query $y_j$, a specifiable number k of greatest attention weights from the transformed attention weight matrix $\tilde{M}_w$ is ascertained 12 for the relevant object query $y_j$. The specifiable number k of greatest attention weights is 100 in this example. This can be carried out for all layers K of the decoder 6 or only for a single layer, in particular for the last layer or for multiple layers of the decoder. The greatest attention weights $w_{max}$ are the attention weights $w_{p,q,i}$ for which: $p,q \in S^k$. Then, a covariance matrix is calculated 13 for the greatest attention weights $w_{max}$ (i.e., for $w_{p,q,i}$ where $p,q \in S^k$):

$$C_k = \frac{1}{W}\sum_{p,q\in S^k} w_{p,q,i}\left[\begin{pmatrix} x_q \\ y_p \end{pmatrix} - \mu_k\right]\left[\begin{pmatrix} x_q \\ y_p \end{pmatrix} - \mu_k\right]^T$$

where $W=\Sigma_{p,q\in S^k} w_{p,q,i}$, $x_q$ is the position in the x direction of the grid, $y_p$ is the position in the y direction of the grid, and $\mu_k$ is the empirical expected value for the greatest attention weights $w_{max}$ of the decoder 6 and is defined as follows:

$$\mu_k = \frac{1}{W}\sum_{p,q\in S^k} w_{p,q,i}\begin{pmatrix} x_q \\ y_p \end{pmatrix}$$

Finally, the determinant of this covariance matrix $C_k$ is calculated 14, and thus the attention spread AS is obtained as a value.

$$AS = \det C_k$$

Figure 3:
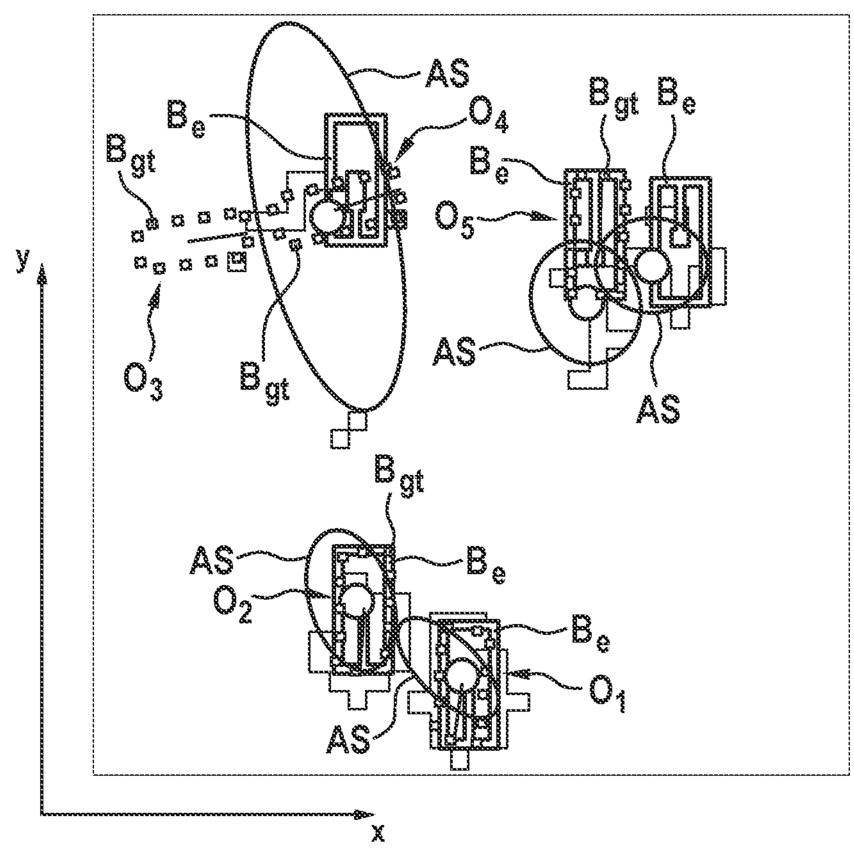
FIG. 3 shows a detail of a grid from the bird's eye view in which the ascertained bounding boxes, the attention spread, and bounding boxes according to the ground truth are shown, according to an example embodiment of the present invention.

FIG. 3 shows a grid from the bird's eye view, which was recorded by a vehicle F at a distance of 30 to 50. The vehicle F (not shown here) lies at the above-mentioned distance on the negative y-axis. For five objects $O_1$, $O_2$, $O_3$, $O_4$ and $O_5$, the ascertained bounding boxes $B_e$ and the bounding boxes $B_{gt}$ according to the ground truth are shown, and the calculated attention spread AS is indicated as an ellipse. For the two objects $O_1$ and $O_2$ located closer (at the bottom), the relevant ascertained bounding boxes $B_e$ are on or only just next to the bounding boxes $B_{gt}$ according to the ground truth. The attention spread AS is small, which is expressed by the small ellipse. For the objects $O_3$ and $O_4$ further away (shown at the top left), only one bounding box $B_e$ was ascertained, namely for the object $O_4$. The attention spread AS is very large, which is expressed by the large ellipse. For the object $O_5$ likewise further away (shown at the top right), two bounding boxes $B_e$ were ascertained, wherein an ascertained bounding box $B_e$ coincides with the bounding box $B_{gt}$ of the ground truth, and the other ascertained bounding box $B_e$ lies next to this. However, the attention spread AS of the adjacent ascertained bounding box $B_e$ protrudes into the other ascertained bounding box $B_e$.

What is claimed is:

1. A method for identifying uncertainties during detection and/or tracking of multiple objects from point cloud data collected by a sensor onboard a vehicle using a transformer with an attention model, wherein a state of the tracked objects is stored in a feature space, the method comprising the following steps:

calculating feature vectors from the point cloud data using a backbone, wherein the feature vectors serve as key vectors for the transformer;

calculating anchor positions from the point cloud data using a sampling method;

ascertaining feature vectors from the anchor positions using an encoding, wherein the feature vectors serve as object queries for the transformer;

calculating attention weights for cross-attention from the object queries and a spatial structure used by the backbone;

determining greatest attention weights of the transformer for each of the object queries;

calculating a covariance matrix for the greatest attention weights;

calculating a determinant of the covariance matrix to obtain an attention spread; and based on the attention spread, determining a confidence associated with a detected object, and continuing object tracking of the detected object across successive time points only when the confidence for the detected object is above a threshold value, and pausing or terminating object tracking of the detected object when the confidence is at or below the threshold value.

2. The method according to claim 1, wherein the attention weights are calculated using a decoder of the transformer during ascertainment of result feature vectors from the object queries and the key vectors.

3. The method according to claim 1, wherein the attention weights are ascertained for each layer of the decoder.

4. The method according to claim 1, wherein the spatial structure used by the backbone is a grid, and each of the attention weights is assigned to a respective grid cell of the grid.

5. The method according to claim 1, wherein each of the attention weights is assigned to any point in space.

6. The method according to claim 1, wherein a Huber loss function is used to calculate the covariance matrix.

7. A non-transitory machine-readable storage medium on which is stored a computer program for identifying uncertainties during detection and/or tracking of multiple objects from point cloud data collected by a sensor onboard a vehicle using a transformer with an attention model, wherein a state of the tracked objects is stored in a feature space, the computer program, when executed by an electronic control unit, causing the electronic control unit to perform the following steps:

calculating feature vectors from the point cloud data using a backbone, wherein the feature vectors serve as key vectors for the transformer;

calculating anchor positions from the point cloud data using a sampling method;

ascertaining feature vectors from the anchor positions using an encoding, wherein the feature vectors serve as object queries for the transformer;

calculating attention weights for cross-attention from the object queries and a spatial structure used by the backbone;

determining greatest attention weights of the transformer for each of the object queries;

calculating a covariance matrix for the greatest attention weights;

calculating a determinant of the covariance matrix to obtain an attention spread; and based on the attention spread, determining a confidence associated with a detected object, and continuing object tracking of the detected object across successive time points only when the confidence for the detected object is above a threshold value, and pausing or terminating object tracking of the detected object when the confidence is at or below the threshold value.

8. An electronic control unit of a vehicle configured to identify uncertainties during detection and/or tracking of multiple objects from point cloud data collected by a sensor onboard the vehicle using a transformer with an attention model, the electronic control unit configured to:

calculate feature vectors from the point cloud data using a backbone, wherein the feature vectors serve as key vectors for the transformer;

calculate anchor positions from the point cloud data using a sampling method;

ascertain feature vectors from the anchor positions using an encoding, wherein the feature vectors serve as object queries for the transformer;

calculate attention weights for cross-attention from the object queries and a spatial structure used by the backbone;

determine greatest attention weights of the transformer for each of the object queries;

calculate a covariance matrix for the greatest attention weights;

calculate a determinant of the covariance matrix to obtain an attention spread; and based on the attention spread, determine a confidence associated with a detected object, and continuing object tracking of the detected object across successive time points only when the confidence for the detected object is above a threshold value, and pausing or terminating object tracking of the detected object when the confidence is at or below the threshold value.

* * * * *